INVENTOR.
HELMUT F. W. WALTER
BY
ATTORNEY

INVENTOR.
HELMUT F.W. WALTER

BY

ATTORNEY

United States Patent Office 3,166,629
Patented Jan. 19, 1965

3,166,629
MOUNTING MECHANISM FOR ZOOM OPTICAL SYSTEM OF MICROSCOPES
Helmut F. W. Walter, Irondequoit, N.Y., assignor to Bausch & Lomb Incorporated, Rochester, N.Y., a corporation of New York
Filed July 2, 1962, Ser. No. 206,791
3 Claims. (Cl. 88—39)

This invention relates to microscopes and more particularly relates to the mounting mechanism for the optical elements thereof including a variable focus type of objective.

The present invention involves means for mounting a complete microscope optical system and is particularly concerned with the problem of mounting and actuating the movable elements of a component zoom type of variable focus objective and a solution of the difficulties of mounting said movable elements in such a manner as to assure continuous correct optical alignment of the movable optical parts in all of their operative positions.

Accordingly it is an object of this invention to provide mounting means for the optical system of a microscope of the variable focus type, said means being simple in form and yet capable of high grade performance with regard to the movement of the lenses of the optical system in such a reliable manner as to assure constant optical alignment thereof during changes of magnification.

It is a further object of this invention to provide a novel and effective zoom lens mounting mechanism which is easily accessible for adjustment and other service and inspection operations.

It is a still further object of this invention to provide such a device in which the mounting mechanism for the variable focus optical system is so constructed as to be easily operationally adjustable and so as to occupy only a relatively small cross sectional area over the microscope stage so that the general view which the operator has of said stage is improved.

Another object of this invention is to provide a mounting mechanism for a microscope optical system in the form of a sub-assembly which is complete mechanically and optically per se and therefore may be removed from the microscope as an independent operative unit for testing, realignment and servicing operations.

Figure 1:
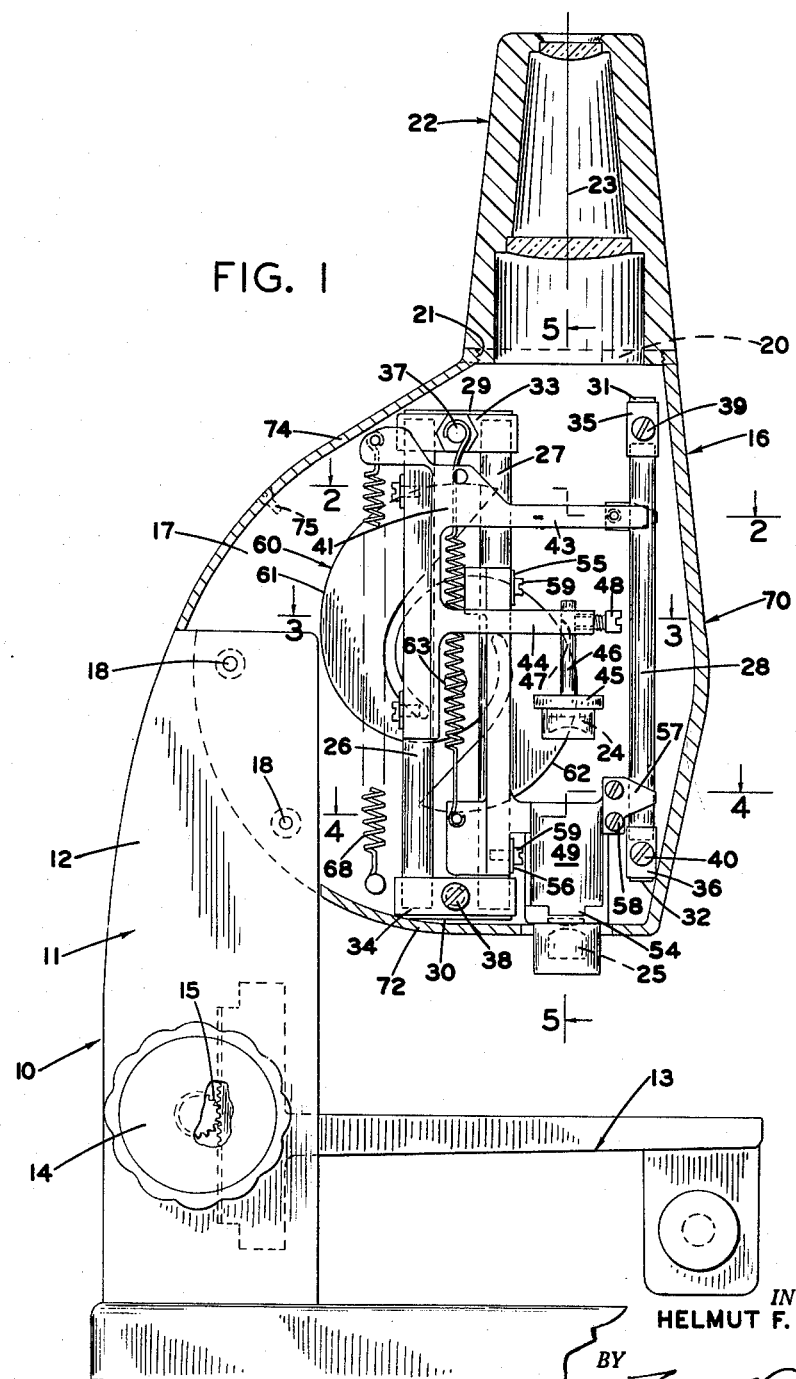
Figure 2:
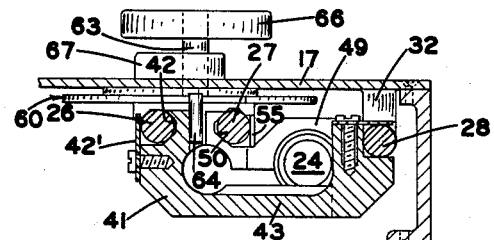
Figure 3:
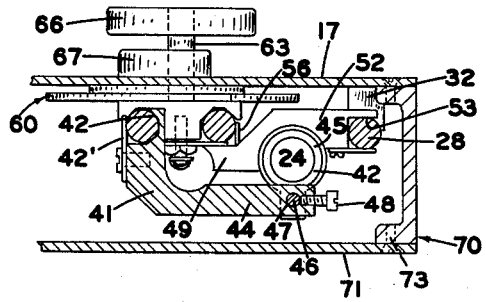
Figure 4:
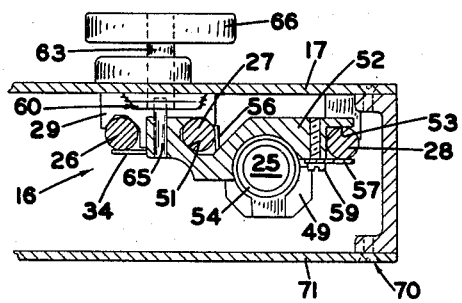
Figure 5:
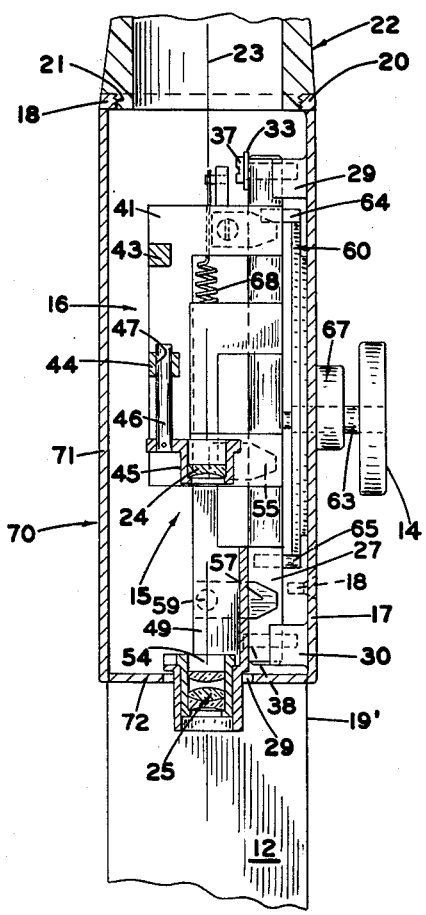

These and other objects of this invention will be apparent hereinafter from a study of the details of construction and combination of parts as described in the specification herebelow taken in connection with the accompanying drawings wherein, FIG. 1 is a side elevation of a preferred form of the present invention showing parts of a microscope removed and shown in section, FIG. 2 is a cross sectional view taken on the line 2—2 of FIG. 1, FIG. 3 is a sectional view taken substantially on the line 3—3 of FIG. 1, FIG. 4 is a sectional view taken on the line 4—4 of FIG. 1, and FIG. 5 is a longitudinal sectional view taken on the line 5—5 of FIG. 1.

A preferred embodiment of the present invention is shown in FIG. 1 comprising a microscope generally indicated by the numeral 10, said microscope comprising a stand 11 on which is formed an upstanding arm 12. At the base of the arm 12 is mounted a stage 13 in the usual manner, said stage being preferably focusable by means of a focusing knob 14 and associated gearing 15 which is rotatably mounted in the lower part of the arm 12.

According to this invention, the optical system of the microscope 10 constitutes an effectively independent sub-assembly which is completely operative in itself both optically and mechanically. Although said sub-assembly is described and shown in its preferred form in the specification and drawings herewith, it should be understood that other forms and modifications are possible within the purview of this invention, particularly with reference to the structure and arrangement of the mounting of the upper lens member. A sub-assembly generally designated by the numeral 16 comprises a mounting plate 17 which is fixed on the upper part of the arm 12 in vertical position by means of appropriate screws or other holding devices 18, the plate 17 being secured in contact with a vertically formed mounting surface 19 on said arm 12.

On said plate 17 is formed an annular ring type flange 20 projecting laterally therefrom at the top of the plate 17. Said flange is internally threaded or otherwise formed at 21 to receive the lower end of an eyepiece member generally designated by the numeral 22. In optical alignment with said eyepiece member 22 along its optical axis 23 and below said flange 20 is optically aligned a pair of lenses 24 and 25, said lenses being movably mounted for a motion in the direction of the axis 23 on a series of parallel support rods 26, 27 and a guide rod 28. Said rods 26, 27 and 28 are fixed at their terminal upper and lower ends on suitable grooved mounting pads 29, 30, 31, 32 and are retained therein by overlaying clips 33, 34, 35 and 36 by means of appropriate screws or bolts 37, 38, 39 and 40. The support rods 26 and 27 are prime support rods for the proper operative alignment of the lenses 24 and 25 and the rods 28 serves as a guide rod. On support rod 26 is mounted a slidable lens carriage 41 wherein the upper lens 24 is held, said carriage having a V-shaped bearing surface 42 in contact therewith at the top and bottom. Spring clips 42' are secured in clamping position against rods 27 and 28 by suitable screws or rivets shown in FIG. 2 and FIG. 3. Adjacent to the upper end of the carriage 41 is formed an outrigger arm 43 which reaches across the optical axis 23 in laterally displaced position so as to avoid infringing on the optical field of the optical system near the lower end of the carriage 41. In the form of the invention here described, a second outrigger arm 44 is formed thereon which reaches outwardly past the position of the optical axis 23 and is laterally displaced therefrom in the same manner as the arm 43 so as to avoid infringing on the field of the optical system.

In the outrigger arm 43 is held a lens cell 45 concentric with the optical axis 23, said cell 45 having a vertical support stem 46 integral therewith which is slidably fitted in a bore 47 formed in the arm 43. The stem 46 is thereby vertically adjustable in the arm 43 so as to focus the lens vertically and said stem is secured in its desired vertical adjusted position by a lock screw 48 which is threaded through a screw hole in the arm 43 so as to bear frictionally against the stem 46. As above mentioned, the mounting and adjusting mechanism for lens 24 may be provided in alternative forms within the purview of this invention.

On the mounting rod 27 is slidably mounted a second lens carriage 49 and it is held by a V-shaped bearing surface 50 which is formed in the upper end of the carriage and a lower bearing surface 51 which is formed in the lower part of the carriage 41. An out-rigger arm 52 is formed on the lower end of the carriage 49 which retains on its outer end a suitable bearing surface 53 for engagement with the mounting rod or guide rod 28. On the out-rigger arm 52 is formed a lens cell 54 wherein the lower movable lens 25 is suitably secured in any preferred manner so as to be optically aligned with lens 24 and eyepiece member 22. The various bearing surfaces 50, 51 and 53 thereof are held against their respective rods 26, 27 and 28 by means of spring clips 55, 56 and 57 which are held against said rods by suitable screws or bolts 58 and 59.

It will be noted at this point that the two primary support rods 26 and 27 are positioned close to each other at one side of the optical axis 23 and the guide rod 28 is positioned on the opposite side of the optical axis so that the lenses 24 and 25 are held therebetween reliably optically aligned with each other on the optical axis 23.

Another feature of this invention concerns the means for moving the lens carriages 41 and 49 along their support rods 26, 27. Said means comprises a simple flat formed cam wheel 60 having two operational spiral cam surfaces 61 and 62 formed thereon in opposed relation to each other. The cam wheel 60 is rotatably mounted on an operating shaft 63 which is suitably journaled in the mounting plate 17 so as to project laterally through the space between the mounting rods 26 and 27. The cam wheel 60 rotates in a plane parallel to the plane in which the rods 26, 27 lie and suitable operational connections between the lens carriages 41 and 49 and the corresponding spiral cam surfaces 61 and 62 are provided in the form of cam followers 64 and 65.

In order to move the lenses 24 and 25 in such a relative manner as to simultaneously and cooperatively produce a change in magnification of the image of the specimen, the spiral surfaces 61 and 62 are properly geometrically shaped to effectively perform the magnification function. On the operating shaft 63 is positioned an operating knob 66 and means are provided for limiting the rotational movement of said operating shaft in the form of a rotation stop mechanism generally shown by numeral 67, said mechanism being held on the shaft 63 in operating position on the mounting plate 17 adjacent to the knob 66.

Suitable adjusting means not shown for axially adjusting the lens 25 are provided within the lens cell 54.

For maintaining the cam followers 64 and 65 reliably against the spiral cam surfaces 61 and 62, a pair of tension springs 68 and 69 is provided, spring 68 being anchored at one end to plate 17 and at the other end on the carriage 41 while the spring 69 is retained by the screw 37 of the mounting mechanism and its other end is attached to the carriage 49 in any suitable manner as shown.

Another novel feature of this invention is provided in the cover or housing generally designated by the numeral 70. Said cover 70 comprises a front wall 71 which is contiguous with a bottom wall 72. The housing 70 is preferably constructed in the form of a cover which is semi-permanently attached to the mounting plate 17, by suitable means such as the screws 73. At the upper rear portion of the mounting plate 17 is attached another portion of the housing 70 in the form of a rear wall 74 which is attached to the mounting plate preferably by means of screws 75. The cover may be quickly and easily removed for access into the operating mechanism of the zoom optical system.

It will be realized that the foregoing description describes an extremely simple and inexpensive mechanism for mounting a two member zoom optical system in such a manner that it is easily accessible for inspection, assembly and service, said mechanism being so constructed as to provide high grade optical performance of the zoom optical system in all of its operative positions and additionally provide for good independent adjustment of the alignment between the eyepiece member and the zoom optical system.

Although only certain forms and arrangements of this invention have been shown and described in detail, other forms and arrangements are possible and changes may be made in the details of construction without departing from the spirit of the invention as defined in the claims here appended.

I claim:

1. A microscope having a stage on which a specimen is held, said stage being carried on an arm extending upwardly therefrom, a housing formed on the upper portion of the arm, said housing including a flat mounting plate, mounting means for a variable focus optical system which includes an upper and a lower movable lens holder wherein two lens components of said system are secured, a pair of closely spaced vertical and parallel mounting rods on which the two lens holders are slidably mounted individually, said rods lying close to and parallel to said plate, a guide rod extending parallel to said mounting rods near said plate and spaced therefrom on opposite sides of said lens components so as to interpose said components therebetween, an outreaching arm formed on each said holder and extending laterally into sliding contact with said guide rod, means for anchoring all of the rods in spaced relation to said plate, a pair of mutually inclined contact surfaces forming a V groove in at least two widely spaced vertically aligned locations of each said holders so as to slidably fit against both of the mounting rods and said guide rod, the bottoms of the V grooves in each holder lying in the space between said mounting rods, a spring blade fixed on each holder in a position to force said mounting rods into their respective grooves, a cam wheel rotatably mounted on said plate on an axis extending between said rods for simultaneously moving each holder with a prescribed different motion so as to vary the magnification of said system, said wheel being located in the space between said rods and plate and being characterized by two different spiral cam surfaces formed on the rim portions of two opposite radial cam lobes on said wheel, cam follower means formed on each holder and projecting into operative engagement with the respective cam surfaces, means for rotating said wheel, and means for viewing the image formed by the variable focus optical system, whereby a flat and compact construction for a demountable housing is provided for the optical parts which may be separately assembled and tested per se.

2. A microscope as set forth in claim 1 further including means for demountably attaching said flat mounting plate to said arm, a ring type flange formed laterally on the top edge of said flat mounting plate, an eyepiece constituting said viewing means secured in said flange in offset position adjacent to said flat mounting plate and having its optical axis spaced from and parallel to the inner surface of said flat mounting plate.

3. A microscope as set forth in claim 1 further including a vertical side face formed on the upper end of said arm, means for demountably securing said flat mounting plate against said face, an eyepiece member constituting said viewing means, a ring shaped shelf wherein a thread is formed defining an opening wherein said eyepiece member is secured, said shelf being formed laterally of and along the upper edge of said flat mounting plate so that the member is held uprightly therein, and a wall of said housing spaced from said flat mounting plate so as to be flush with said shelf and shaped similarly thereto, said housing further including a connecting edge portion extending between said flat mounting plate and said wall around a major part of the periphery of the flat mounting plate, said flat mounting plate, wall and connecting portion constituting said housing, the wall and connecting portion being carried by the flat mounting plate.

References Cited in the file of this patent

UNITED STATES PATENTS

| | | |
|---|---|---|
| 2,165,341 | Capstaff et al. | July 11, 1939 |
| 2,907,255 | Meixner | Oct. 6, 1959 |
| 2,942,519 | Boughton et al. | June 28, 1960 |
| 3,028,791 | Clark et al. | Apr. 10, 1962 |
| 3,028,792 | Krajowsky et al. | Apr. 10, 1962 |
| 3,062,102 | Martin | Nov. 6, 1962 |
| 3,106,125 | Martin et al. | Oct. 8, 1963 |

FOREIGN PATENTS

| | | |
|---|---|---|
| 735,180 | Germany | May 7, 1943 |